（12） United States Patent
Takaoka

(10) Patent No.: US 6,723,194 B2
(45) Date of Patent: Apr. 20, 2004

(54) METHOD FOR WRAPPING RUBBER STRIP AND WRAPPING APPARATUS

(75) Inventor: Tatsuya Takaoka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/767,961

(22) Filed: Jan. 24, 2001

(65) Prior Publication Data

US 2001/0050135 A1 Dec. 13, 2001

(30) Foreign Application Priority Data

Jan. 25, 2000 (JP) ....................................... 2000-015552

(51) Int. Cl.$^7$ .............................................. B29D 30/62
(52) U.S. Cl. ........................ 156/117; 156/130; 156/397
(58) Field of Search .............................. 156/130, 130.3, 156/184, 229, 244.13, 446, 117, 397

(56) References Cited

U.S. PATENT DOCUMENTS 4,279,683 A * 7/1981 Landsness ................... 156/397
4,371,410 A * 2/1983 Stevens ....................... 156/117
5,059,268 A * 10/1991 Satoh et al. ............... 156/130.3
6,372,070 B1 * 4/2002 Iizuka et al. ................. 156/117

FOREIGN PATENT DOCUMENTS

JP     11048363 A  *  2/1999  ........... B29D/30/16

OTHER PUBLICATIONS

Abstract and machine translation of JP 11048363.*
Merriam Webster's Collegiate Dictionary Tenth Edition definition of "cut".*

* cited by examiner

Primary Examiner—Jeff H. Aftergut
Assistant Examiner—John L. Goff
(74) Attorney, Agent, or Firm—Rader, Fishman & Grauer PLLC

(57) ABSTRACT

The invention is a method or a device for wrapping the rubber strip around the forming drum while extruding an unvulcanized rubber strip from an injection device, wherein the rubber strip is pressed by a guide roll against the forming drum under tension, as well as a space for absorbing variations in an amount of extrusion of the rubber strip is formed between the guide roll and an extrusion outlet of the injection device, the forming drum is rotated in synchronism with extrusion of the rubber strip so that the guide roll is driven, and the rubber strip guided by the guide roll is wrapped around the forming drum.

4 Claims, 3 Drawing Sheets

FIG.I

METHOD FOR WRAPPING RUBBER STRIP AND WRAPPING APPARATUS

BACKGROUND OF THE INVENTION

The invention relates to a method for wrapping a rubber strip around a forming drum in the manufacture of a pneumatic tire and a wrapping apparatus, and more particularly to a method for wrapping a rubber strip and a wrapping apparatus in which an accuracy of wrapping the rubber strip is improved.

As a method for manufacturing the pneumatic tire, a process including the steps of supplying an unvulcanized rubber strip from an injection device continuously, wrapping the rubber strip around the forming drum and forming tire-constituting members such as a cap tread, an under tread, a side tread and a rim cushion rubber part based on a laminated structure of the rubber strip is performed.

There have been advantages by forming the tire-constituting members directly in such manner as described above that manufacturing efficiency of the tire can be improved, as well as space savings can be realized since the tire-constituting members formed in advance are not stored, and, as a result, manufacturing cost of the tire can be reduced.

However, it has been extremely difficult to wrap around the forming drum with high accuracy since the rubber strip in an initial stage extruded from the injection device tends to result in overshoot and thus unstable output. In such manner as described above, when the accuracy of wrapping the rubber strip is inferior, quality of the pneumatic tire becomes unstable.

SUMMARY OF THE INVENTION

The object of the invention is to provide a method for wrapping a rubber strip and a wrapping device in which variation in an amount of extrusion of the rubber strip is absorbed between the injection device and the forming drum, whereby the rubber strip can be wrapped with the high accuracy.

A method for wrapping rubber strip according to the invention for accomplishing the object described above is a method for wrapping a rubber strip around a forming drum while extruding an unvulcanized rubber strip from an injection device comprises the steps of:

pressing the rubber strip by a guide roll against the forming drum under tension while forming a space for absorbing variations in an amount of extrusion of the rubber strip between the guide roll and an extrusion outlet of the injection device;

rotating the forming drum in synchronism with extrusion of the rubber strip so that the guide roll is driven; and wrapping the rubber strip guided by the guide roll around the forming drum, In such manner as described above, since the rubber strip is pressed by the guide roll against the forming drum under tension while a space is formed for absorbing variations in the amount of extrusion of the rubber strip between the guide roll and the extrusion outlet of the injection device, even though the amount of extrusion of the rubber strip is unstable at an initial stage of extrusion, variations in the amount of extrusion can be absorbed in the space. Therefore, the rubber strip guided by the guide roll can be wrapped around the forming drum with high accuracy. Moreover, an excellent guiding function is shown and the accuracy of wrapping further is improved, when an angle of contact between the guide roll and the rubber strip is sufficiently large.

On the other hand, a device for wrapping a rubber strip according to the invention for accomplishing the object described above is a device for wrapping a rubber strip around a forming drum while extruding an unvulcanized rubber strip from an injection device, that comprises a guide roll arranged between the injection device and the forming drum through a freely stretchable and contractible arm member along a supplying channel for the rubber strip, wherein the rubber strip is pressed by the guide roll against the forming drum under tension when the arm is stretched, as well as a space for absorbing variations in an amount of extrusion of the rubber strip is formed between the guide roll and an extrusion outlet of the injection device.

In the invention, it is preferable that the guide roll is released from the forming drum at a final stage of wrapping of the rubber strip to form a clearance between the forming drum and the guide roll, and the rubber strip is cut off within the clearance. The rubber strip is cut off within the clearance as described above, whereby a subsequent wrapping operation can be performed successively, since the cut end of the rubber strip still remains on the guide roll. Moreover, tension is applied to the rubber strip from an initial stage of wrapping at the subsequent wrapping operation, whereby the rubber strip can be wrapped with high accuracy. As such a device in this case, a cutting device which cuts off the rubber strip within a clearance can be provided and the clearance arranged between the forming drum and the guide roll when the arm member is contracted.

Moreover, a press roll for pressing the cut end of the rubber strip against the forming drum can be provided at the vicinity of the guide roll when the cut end is pressed against the forming drum by the press roll and disarrangement of the out end of the rubber strip is prevented.

DETAILED DESCRIPTION OF THE PREFERRED EMBODIMENTS

Hereinafter, the invention will be described with reference to drawings.

Figure 1:
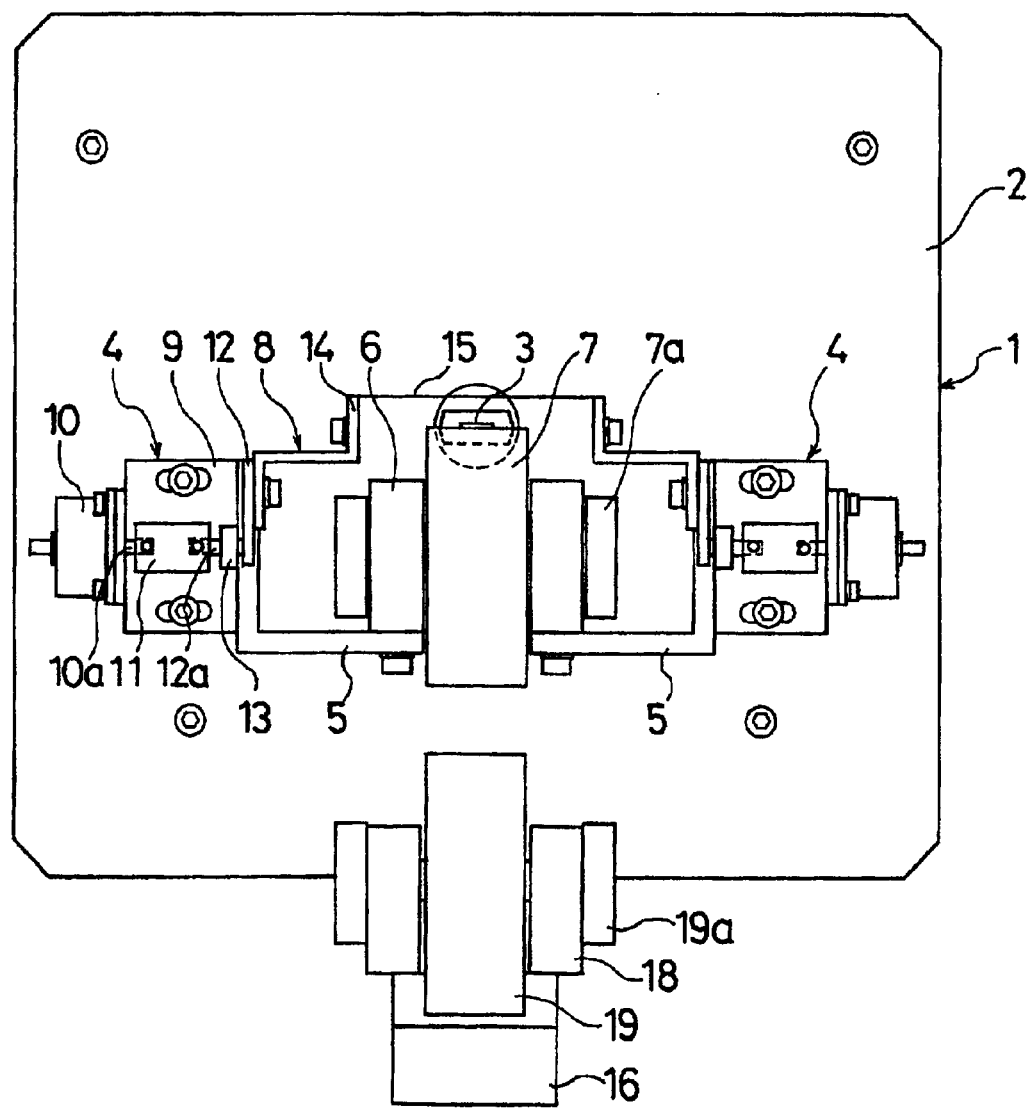
FIG. 1 is an enlarged front elevational view showing component parts of a device for wrapping a rubber strip according to an embodiment of the invention.
Figure 2:
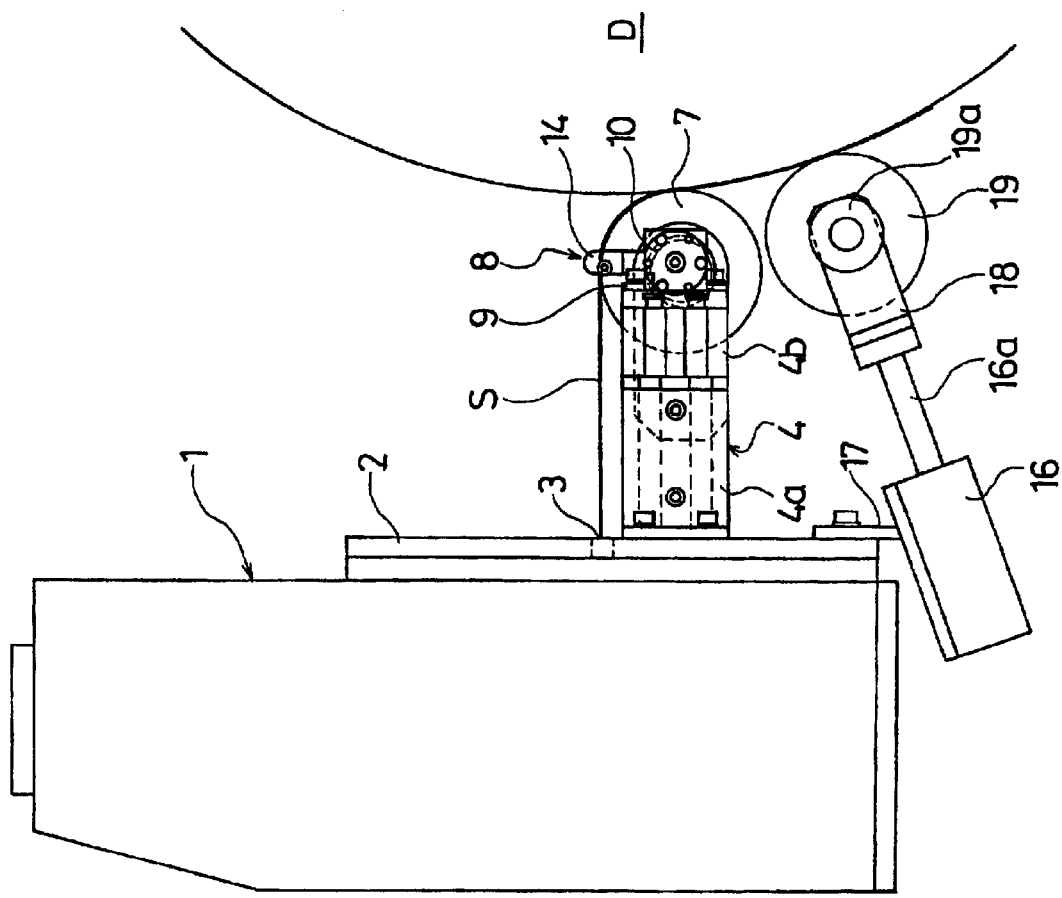
FIG. 2 is a side elevational view showing the device (during wrapping) for wrapping a rubber strip according to the embodiment of the invention.
Figure 3:
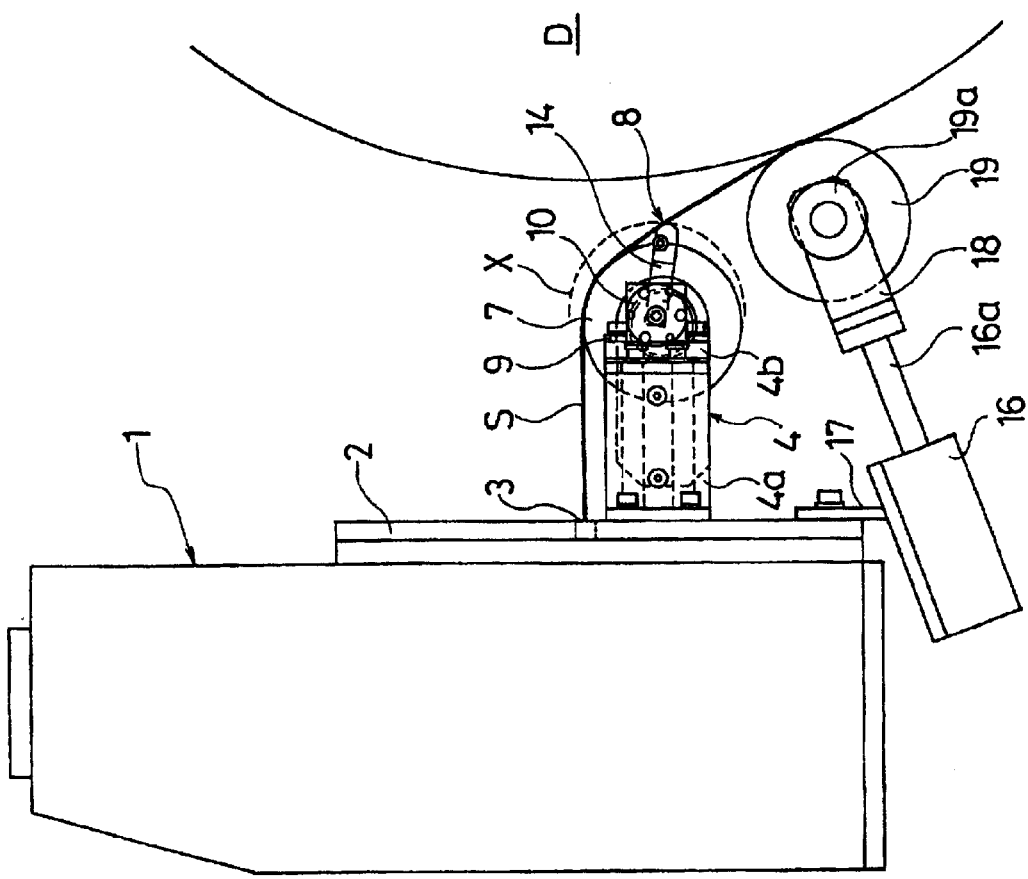
FIG. 3 is a side elevational view showing the device (during cutting off) for wrapping a rubber strip according to the embodiment of the invention.

FIG. 1 to FIG. 3 show the devices for wrapping a rubber strip according to the embodiment of the invention. The wrapping device according to this embodiment is constituted in such manner that an injection device 1 is arranged so as to oppose an outer peripheral surface of a forming drum D, and this injection device 1 is reciprocated in an axial direction of the forming drum D. A quantitative extruder of a plunger type, which is not limited thereto in particular, may preferably be used in order to extrude the tire-constituting members of one tire precisely and quantitatively for an extruding mechanism of the injection device 1.

The injection device 1 is designed to comprise the extrusion outlet 3 at a front plate 2 to extrude a rubber strip S from the extrusion outlet 3 continuously. A pair of arm members 4 and 4 on left and right sides are arranged on the front plate 2 in a horizontal direction toward the forming drum D. The arm member 4 comprises a fixed section 4a attached to the front plate 2 and a moving section 4b freely stretchable and contractible from the fixed section 4a along a supplying channel for the rubber strip S, and is designed to produce a stretching or a contracting motion by an air cylinder or the like.

A bracket 5 is attached to a side of the moving section 4b of each arm member 4. Moreover, a guide roll 7 is born through a bearing member 6 attached across a pair of brackets 5 and 5 on left and right sides on a tip side of the arm member 4. Engagement members 7a are attached to both ends of the guide roll 7. Moreover, the guide roll 7 is driven by the forming drum D to revolve in one direction, but removing in the reverse direction is restrained. Therefore, the guide roll 7 can apply tension to the rubber strip S supplied from the injection device 1.

As shown in FIG. 2, the rubber strip S is pressed against the forming drum D under tension by the guide roll 7 when the arm member 4 is stretched and a space is formed for absorbing variations in the amount of extrusion of the rubber strip S between the guide roll 7 and the extrusion outlet 3 of the injection device. A length of the space is preferably 100 mm to 200 mm in order to absorb overshoot in the initial stage. On the other hand, a clearance is formed between the forming drum D and the guide roll 7 when the arm member 4 is contracted as shown in FIG. 3.

The cutting device 8 for cutting off the rubber strip S between the forming drum D and the guide roll 7 is arranged on the tip portion of the arm member 4. Namely, a bracket 9 is attached to an and of the moving section 4b of each arm member 4, and a rotary actuator 10b installed on the bracket 9. A rotary shaft 10a of the rotary actuator 10 is coupled with a swiveling shaft 12a of a swiveling wing 12 through a coupling 11. This swiveling shaft 12a is born by a bearing 13. A bracket 14 is coupled with the swiveling wing 12. Moreover, a wire 15 provided as a cutter is tensioned and arranged across a pair of brackets 14 and 14 on the left and right sides.

The described-above cutting device 8 is designed to rotate the wire 15 along a track X shown by a dashed line shown in FIG. 3 by driving of the rotary actuator 10, thereby to cut off the rubber strip S between the forming drum D and the guide roll 7.

On the lower side of the guide roll 7, a cylinder 16 having a freely stretchable and contractible rod 16a is attached to the front plate 2 through a bracket 17. A press roll 19 is born through a bearing member 18 on a tip portion of the rod 16a. Engagement members 19a are attached to both ends of the rotary shaft of the press roll 19. The press roll 19 pressurizes the rubber strip S against the forming drum D at all times.

Next, an operation of the device for wrapping a rubber strip will be described. First, the rubber strip S is extruded from the extrusion outlet 3 of the injection device 1 at a predetermined length and the tip portion thereof is set on the guide roll 7. At this point of time, the rubber strip S is provided with a length capable of being pasted to the forming drum D.

Next, the rubber strip S is pressed by the guide roll 7 against the forming drum D under tension by moving the arm member 4 into the stretched condition, as well as the space for absorbing variations in the amount of extrusion of the rubber strip S is formed between the guide roll 7 and the extrusion outlet 3 of the injection device 1 as shown in FIG. 2. Subsequently, the guide roll 7 which comes in contact with the forming drum D through the rubber strip S is driven by rotating the forming drum D, synchronizing with extrusion of the rubber strip S. According to this operation, the rubber strip S guided by the guide roll 7 is wrapped around the outer peripheral surface of the forming drum.

As mentioned above, the rubber strip S is pressed against the forming drum D under tension by the guide roll 7 and the space for absorbing variations in the amount of extrusion of the rubber strip S is formed between the guide roll 7 and the extrusion outlet 3 of the injection device 1, whereby the variations can be absorbed in the space between the guide, roll 7 and the extrusion outlet 3, even though the rubber strip S shows unstable output. Namely, since tension is applied to the rubber strip S, the rubber strip S can not be bent or waved even though overshoot has occurred. Therefore, in a strip-winding forming method using the injection device 1, the rubber strip can be wrapped with high accuracy.

As shown in FIG. 3, the arm member 4 is moved into a contracted condition right before the end of the wrapping, whereby the guide roll 7 is released from the forming drum D and the clearance is formed between the forming drum D and the guide roll 7. Subsequently, the rubber strip S is cut off between the forming drum D and the guide roll 7 by rotating the wire 15 of the cutting device 8.

As mentioned above, the rubber strip S is cut off within the clearance between the forming drum D and the guide roll 7, whereby the cut end of the rubber strip S still remains on the guide roll 7. Consequently, the rubber strip S is not required to be introduced on the guide roll 7 by manual work when initiating the subsequent wrapping operation, whereby a plurality of wrapping operations can be performed successively. Moreover, since the guide roll 7 is moved toward the side of the forming drum D at the subsequent wrapping operation, thereby tension is applied to the rubber strip S from an initial stage of wrapping, the rubber strip S can be wrapped with high accuracy.

Moreover, the cut end is pressed against the forming drum D by the press roll 19 when the rubber strip S is cut off, whereby the cut end of the rubber strip S can be prevented from being disarranged and the accuracy of wrapping can further be improved.

In the invention, the number of wrappings of the rubber strip S against the forming drum D and the amount of movement of the rubber strip S in the axial direction of the forming drum D are controlled, whereby the tire-constituting members having the desired cross section can be formed on the outer peripheral side of the forming drum D, therefore, these tire-constituting members can be formed with high accuracy. A cap tread, an under tread, a side tread and a rim cushion rubber part or the like for pneumatic tire can be listed as the described-above tire-constituting members.

According to the invention as described above, the rubber strip is pressed against the forming drum under tension by the guide roll, as well as the space for absorbing variations in the amount of extrusion of the rubber strip is formed between the guide roll and the extrusion outlet of the injection device, the forming drum is rotated in synchronism with extrusion of the rubber strip so that the guide roll is driven, and the rubber strip guided by the guide roll is wrapped around the forming drum, whereby the variations can be absorbed in the space, even though the amount of extrusion of the rubber strip is not stabilized at the initial stage of extrusion or the like, therefore, the rubber strip can be wrapped with high accuracy.

What is claimed is:

1. A method for wrapping a rubber strip around a forming drum, with the help of a rubber strip wrapping apparatus comprising an injection device operative for extruding an unvulcanized rubber strip from an extrusion outlet and a guide roll device connected to said injection device and having a guide roll rotatable about a guide roll axis and movable to and between an extended state and a retracted state, relative to the injection device the method comprising the steps of:

extruding said unvulcanized rubber strip from said extrusion outlet of said injection device;

providing said extruded unvulcanized rubber strip directly from said extrusion outlet to said guide roll;

pressing said rubber strip by said guide roll, when said guide roll is in the extended state, against said forming drum under tension, said guide roll and said extrusion outlet of said injection device disposed apart from one another at a length defining a space therebetween, the space sized to receive overshoot amounts of the extruded rubber strip while extruding the unvulcanized rubber strip;

rotating said forming drum in synchronism with extrusion of said rubber strip so that said guide roll is driven when in the extended state; and wrapping the rubber strip guided by said guide roll around said forming drum while extruding the unvulcanized rubber strip.

2. The method for wrapping the rubber strip according to claim 1, with the held of the rubber strip wrapping apparatus further comprising a cutter device connected to said guide roll device and having a cutting element operative to rotate about the guide roll axis, further comprising the steps of:

moving said guide roll from the extended state to the retracted state where said guide roll discontinues pressing the rubber strip against said forming drum thereby relieving tension therebetween at a final stage of wrapping of the rubber strip to form a clearance between said forming drum and said guide roll; and cutting off the rubber strip within the clearance by rotating the cutting element about the guide roll axis.

3. The method for wrapping the rubber strip according to claim 2, with the help of the rubber strip wrapping apparatus further comprising a press roll device having a press roll, further comprising the step of:

pressing a cut end of said rubber strip by said press roll against said forming drum.

4. The method for wrapping the rubber strip according to claim 1, wherein the length of the space is in a range of 100 mm to 200 mm.

* * * * *